United States Patent [19]

Miwa et al.

[11] Patent Number: 4,594,520

[45] Date of Patent: Jun. 10, 1986

[54] LINEAR PULSE MOTOR

[75] Inventors: Zenichiro Miwa; Hiroshi Nakagawa, both of Mie, Japan

[73] Assignee: Shinko Electric Co., Ltd., Tokyo, Japan

[21] Appl. No.: 726,796

[22] Filed: Apr. 24, 1985

[30] Foreign Application Priority Data

Apr. 26, 1984 [JP] Japan .................................. 59-85958
Apr. 26, 1984 [JP] Japan .................................. 59-85959

[51] Int. Cl.$^4$ ............................................ H02K 41/02
[52] U.S. Cl. ...................................... 310/12; 310/13; 318/135
[58] Field of Search .................................. 310/12–14; 318/135, 38

[56] References Cited

U.S. PATENT DOCUMENTS

| 3,857,075 | 12/1974 | Sawyer ................................. | 318/38 |
| 3,878,411 | 4/1975 | Nocito et al. .......................... | 310/12 |
| 4,370,577 | 1/1983 | Wakabayashi et al. ................ | 310/12 |
| 4,504,750 | 3/1985 | Onodera et al. ................... | 318/135 X |

Primary Examiner—Donovan F. Duggan
Attorney, Agent, or Firm—McDougall, Hersh & Scott

[57] ABSTRACT

A linear pulse motor includes; a flat primary body having a pair of first magnetic circuit forming members provided with a coil; a flat secondary body including a second magnetic circuit forming member; the flat primary body and the flat secondary body being in parallel planes to each other and the one being movable relative to the other in one axis of direction; the first magnetic circuit forming members each having two head portions and two leg portions being substantially parallel to each other; first plural teeth being formed at constant pitch in the head portions respectively; the pair of first magnetic circuit forming members being so arranged that the head portions are concentrated to one another; second and third plural teeth being formed at the same constant pitch as the first plural teeth and in parallel rows, in the second magnetic circuit forming member, the second and third plural teeth being shifted from each other by a predetermined length.

17 Claims, 13 Drawing Figures

Prior Art FIG.1
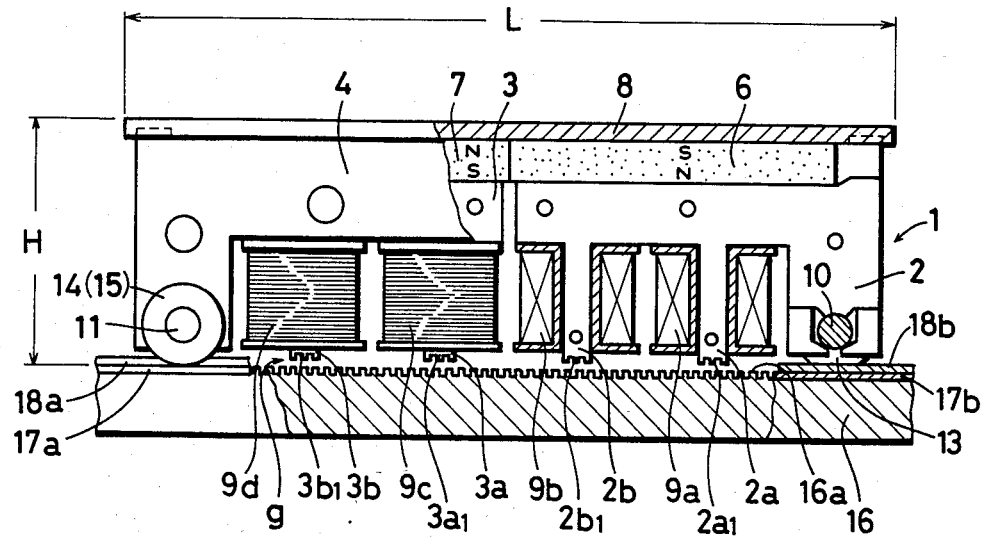
Prior Art FIG.2
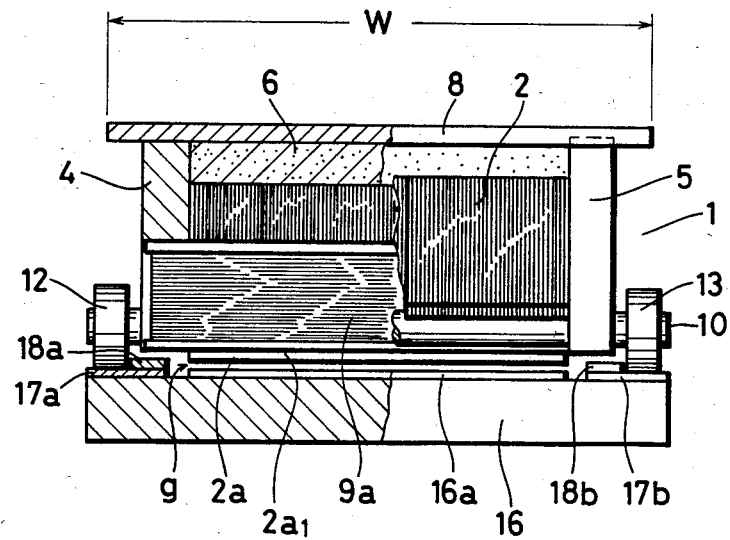

LINEAR PULSE MOTOR

BACKGROUND OF THE INVENTION

1. Field of the Invention

This invention relates to a linear pulse motor, and more particularly to a linear pulse motor which is suitable for small displacement of a moving body.

2. Description of the Prior Art

A linear pulse motor is used, for example, for linearly moving and accurately positioning a head in a printer or an optical read-out apparatus. Necessary displacement and propelling force of the head are relatively small. Nevertheless, the small-sizing of the linear pulse motor is limited to some extent.

SUMMARY OF THE INVENTION

Accordingly, it is an object of this invention to provide a linear pulse motor which can be more small-sized than the prior art linear pulse motor.

Another object of this invention is to provide a linear pulse motor which is suitable for various terminal equipments.

In accordance with an aspect of this invention, a linear pulse motor comprises a flat primary body including a pair of first magnetic circuit forming means provided with coil means; a flat secondary body including second magnetic circuit forming means; said flat primary body and said flat secondary body being in parallel planes to each other and the one being movable relative to the other in one axis of direction; said first magnetic circuit forming means each having two head portions and two leg portions being substantially parallel to each other; first plural teeth being formed at constant pitch in said head portions respectively; said pair of first magnetic circuit forming means being so arranged that said head portions are concentrated to one another; second and third plural teeth being formed at the same constant pitch as said first plural teeth and in parallel rows, in said second magnetic circuit forming means, said second and third plural teeth being shifted from each other by a predetermined length; the groups of said first plural teeth being shifted from one another in a predetermined order by ¼ of the constant pitch (¼P) with respect to said second and third plural teeth; a permanent magnet being so contacted with said head portions of the pair of first magnetic circuit forming means that the two head portions of one of the first magnetic circuit forming means are N-polarized and those of the other of the first magnetic circuit forming means are S-polarized; guide means for guiding said one of the primary body and the secondary body movably in said one axis of direction, arranged between said primary body and said secondary body for maintaining the constant air gap between said first plural teeth and said second and third plural teeth; and the axises of said coil means around which said coil means are wound being substantially perpendicular to said constant air gap.

The above, and other objects, features and advantages of the invention, will be apparent in the following detailed description of illustrative embodiments thereof which is to be read in connection with the accompanying drawings.

BRIEF DESCRIPTION OF THE DRAWINGS

FIG. 1 is a partly-broken side view of a prior art linear pulse motor;

FIG. 2 is a partly-broken front view of the prior art linear pulse motor;

DETAILED DESCRIPTION OF PREFERRED EMBODIMENTS

Figure 3:
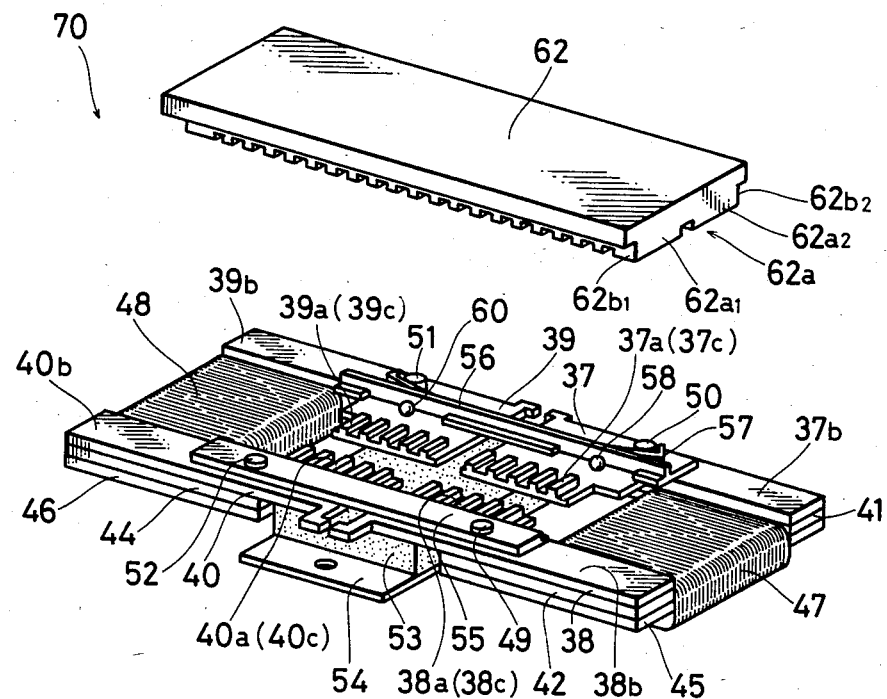
FIG. 3 is a perspective view of a linear pulse motor according to first embodiment of this invention, in which a secondary body is separated away from a primary body.
Figure 5:
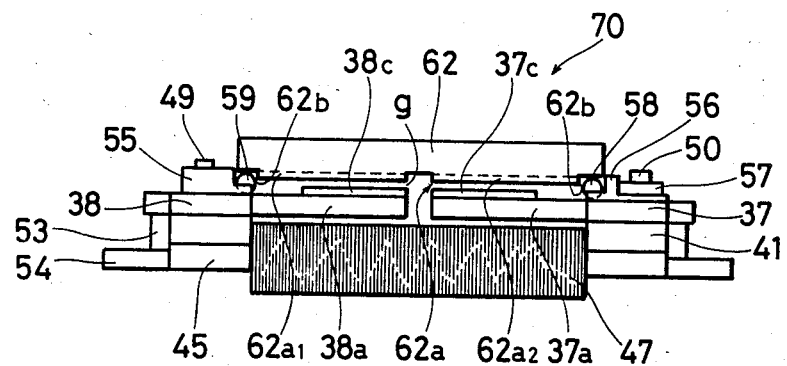
FIG. 5 is a front view of the linear pulse motor of FIG. 3, in which the primary body and the secondary body are assembled with each other.

First, for facilitating the understanding of this invention, a linear pulse motor of prior art will be described with reference to FIG. 1 and FIG. 2.

In a primary body 1, two iron cores 2 and 3 insulated magnetically from each other are fixed to non-magnets 6 and 7 polarized oppositely to each other, as shown in FIG. 1, are attached to the upper surfaces of the iron cores 2 and 3, respectively. A magnetic plate 8 is mounted on the permanent magnets 6 and 7.

The iron cores 2 and 3 include downwardly extending magnetic poles 2a and 2b, and 3a and 3b, respectively. Coils 9a, 9b, 9c and 9d are fitted to the magnetic poles 2a, 2b, 3a and 3b, respectively. Axles 10 and 11 of non-magnetic material are supported by the lower end portions of the side plates 4 and 5. Wheels 12 and 13, and 14 and 15 are rotatably supported on the end portions of the axles 10 and 11, respectively. Three teeth 2a1, 2b1, 3a1 and 3b1, are formed at regular pitches on the lower end surfaces of the magnetic poles 2a, 2b, 3a and 3b, respectively. The pitches of the teeth 2a1, 2b1, 3a1 and 3b1 are equal to each other. However, the teeth 2a1, 2b1, 3a1 and 3b1 of the magnetic poles 2a, 2b, 3a and 3b are shifted, in turn, from one another by length of ¼ pitch.

In a secondary body 16, teeth 16a are formed at regular pitches which are equal to the regular pitches of the teeth 2a1, 2b1, 3a1 and 3b1 of the primary body 1. The secondary body 16 is made of magnetic material. The wheels 12 to 15 ride on non-magnetic band plates 17a and 17b which are fixed on the side end portions of the secondary body 16, and they are guided by non-magnetic guide band plate 18a and 18b which are fixed to the band plates 17a and 17b along the latter. An air gap g is formed between the teeth 2a1, 2b1, 3a1 and 3b1 of the primary body 1, and the teeth 16a of the secondary body 16.

The secondary body 16 is fixed to, although not shown, a stationary body. The primary body is movable.

For example, when the coils 9a to 9d are energized by one-phase energization method, they are, in turn, energized. It is now assumed that the teeth 3b1 of the magnetic-pole 3b face directly to the teeth 16a of the secondary body 16. Then, a constant DC current is supplied to the coil 9a for a predetermined time. Induced magnetic flux flows through the loop consisting of the magnetic pole 2a, the gap g, the secondary body 16, the gap g, the magnetic pole 2b and the yoke portion between the magnetic poles 2a and 2b. Magnetic flux from the permanent magnets 6 and 7 is added to the induced magnetic flux in the magnetic pole 2a, while it is cancelled with the induced magnetic flux in the magnetic pole 2b. Magnetic attraction occurs between the teeth 2a1 of the magnetic pole 2a and the teeth 16a of the secondary body 16. The primary body 1 moves forwards by ¼ pitch so that the teeth 2a1 of the magnetic pole 2a come to face directly to the teeth 16a of the secondary body 16, respectively. Next, the constant DC current is supplied to the coil 9b for the predetermined time. Induced magnetic flux flows through the loop consisting of the magnetic pole 2b, the gap g, the secondary body 16, the gap g, the magnetic pole 2a and the yoke portion between the magnetic poles 2a and 2b. Magnetic flux from the permanent magnets 6 and 7 is added to the induced magnetic flux in the magnetic pole 2b, while it is cancelled with the induced magnetic flux in the magnetic pole 2a. Magnetic attraction occurs between the teeth 2b1 of the magnetic pole 2b and the teeth 16a of the secondary body 16. The primary body 1 moves forwards by ¼ pitch so that the teeth 2b1 of the magnetic pole 2b come to face directly to the teeth 16a of the secondary body 16, respectively.

Similarly, the coils 9c and 9d are, in turn, energized. Thus, the primary body 1 moves forwards step by step in ¼ pitch. Actually, it looks to move continuously forwards.

The above-described linear pulse motor has considerably large length L, height H and width W. A small-sized and thin linear pulse motor is desirable in terminal equipment for office automation applications, for example, in floppy disc drive mechanism. Necessary propelling force to the secondary body or movable body, and stroke are normally small for such applications, and, for example, they are 10 to 100 grams, and 10 to 30 mm. The construction of the prior art linear pulse motor is unsuitable for such applications.

According to this invention, a linear pulse motor can be small-sized and thin, and it is suitable for the above described applications.

Next, a linear pulse motor according to a first embodiment of this invention will be described with reference to FIG. 3 to FIG. 8.

Figure 4:
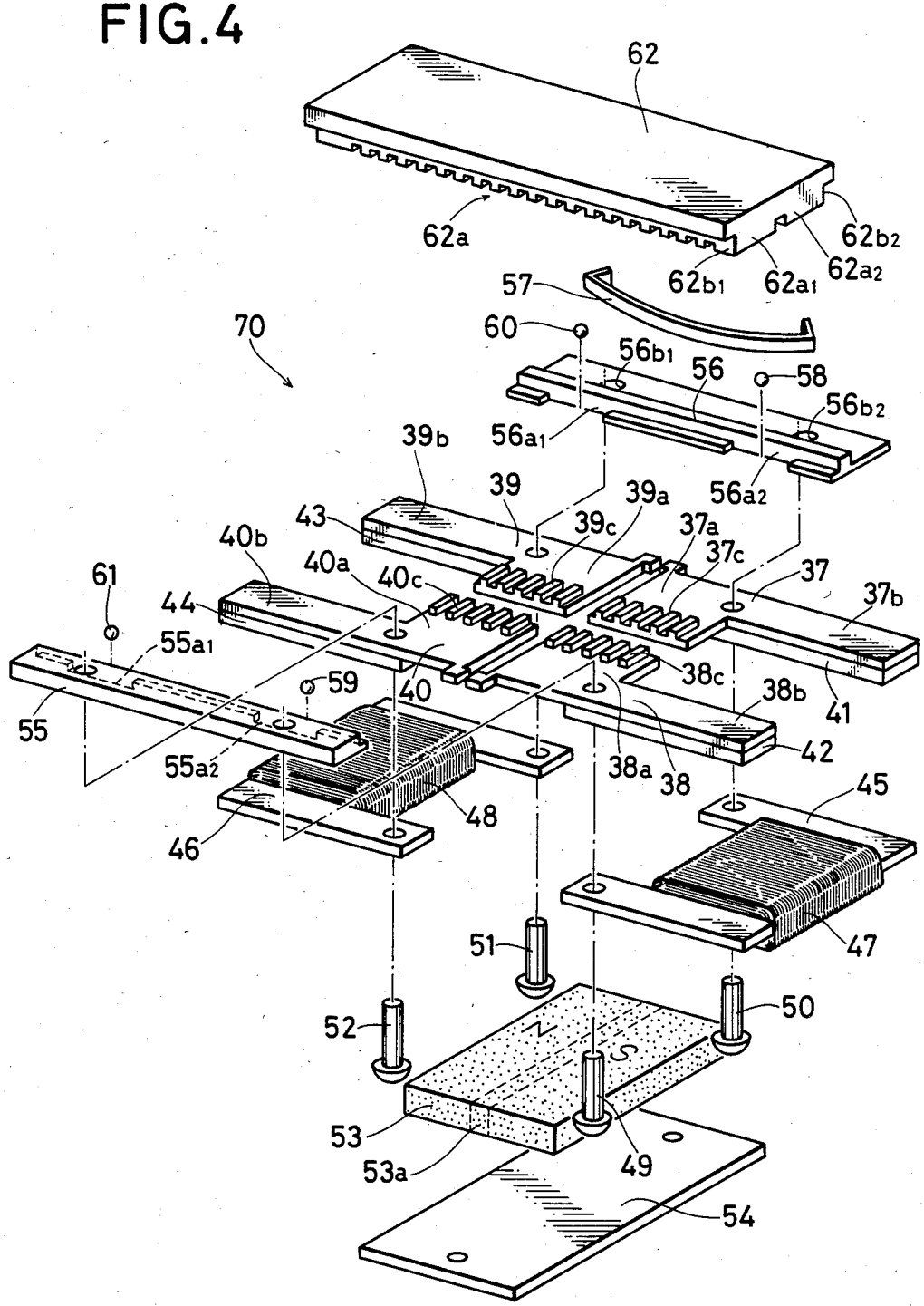
FIG. 4 is an exploded perspective view of the linear pulse motor of FIG. 3.

Referring to FIG. 3 and FIG. 4, four L-shaped magnetic pole members 37 to 40 are so arranged as to form generally a letter H. Head portions 37a to 40a of the magnetic pole members 37 to 40 are concentrated to one another. Five upstanding teeth or ridges 37c to 40c are formed in the end portions of the head portions 37a to 40a, respectively, in parallel with one another. The pitches of the teeth 37c to 40c are equal to one another.

Spacers 41 to 44 of magnetic material are attached to the lower surface of leg portions 37b to 40b of the magnetic pole members 37 to 40. Generally U-shaped magnetic core frames 45 and 46 are fixed through the spacers 41 to 44 to the leg portions 37b and 38b, and 39b and 40b of the magnetic pole members 37 to 40 by revets 49 and 50, and 51 and 52, respectively. Coils 47 and 48 are fitted to the central portions of the magnetic core frames 45 and 46, respectively.

A permanent magnet 53 is so arranged under the head portions 37a to 40a that its N-polarized portion N contacts with the lower surfaces of the head portions 39a and 40a of the magnetic pole members 39 and 40, and that its S-polarized portions S contacts with the lower surfaces of the head portion 37a and 38a. A non-polarized portion 53a is formed between the N-polarized portion N and the S-polarized portions S. A fixing plate 54 of magnetic material is arranged under the permanent magnet 53. It constitutes a part of a magnetic circuit. A primary body 70 consisting of the magnetic pole members 37 to 40, the magnetic core frames 45 and 46, the permanent magnet 53, the coils 47 and 48, etc., is fixed through the fixing plate 54 to a not-shown stationary body.

Guide members 55 and 56 are provided with a pair of ball guide portions 55a1, and 55a2, and a pair of ball guide portions 56a, and 56a2, respectively. The one guide member 55 is fixed to the outer end portion of the head portions 38a, and 40a of the magnetic pole members 38 and 40 by the rivets 49 and 52. A pair of oblong openings 56b1 and 56b2 are formed in the other guide member 56. The rivets 51 and 50 freely pass through the oblong openings 56b1 and 56b2. Accordingly, the other guide member 56 is displaceable in the direction perpendicular to the movement direction of a secondary body 62, within the range of the oblong openings 56b1 and 56b2. A leaf spring 57 is supported at both ends by the rivets 50 and 51 and it urges the other guide member 56 towards the teeth 37c and 39c of the head portions 37a and 39a. Balls 58 to 61 are arranged in the ball guide portions 56a2, 55a2, 56a1 and 55a1.

Figure 6:
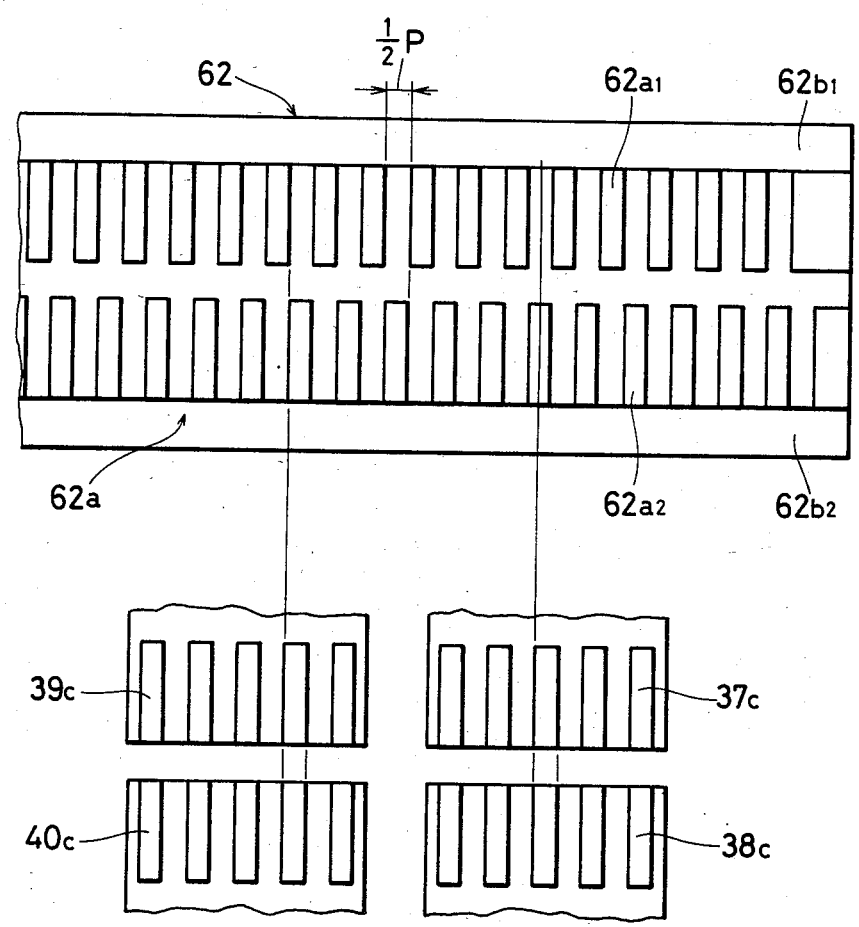
FIG. 6 is a view showing the relationship between first teeth formed in the primary body and second and third teeth formed in the secondary body in which the primary body is partially shown in plan view and the secondary body is partially shown in back view.
Figure 7:
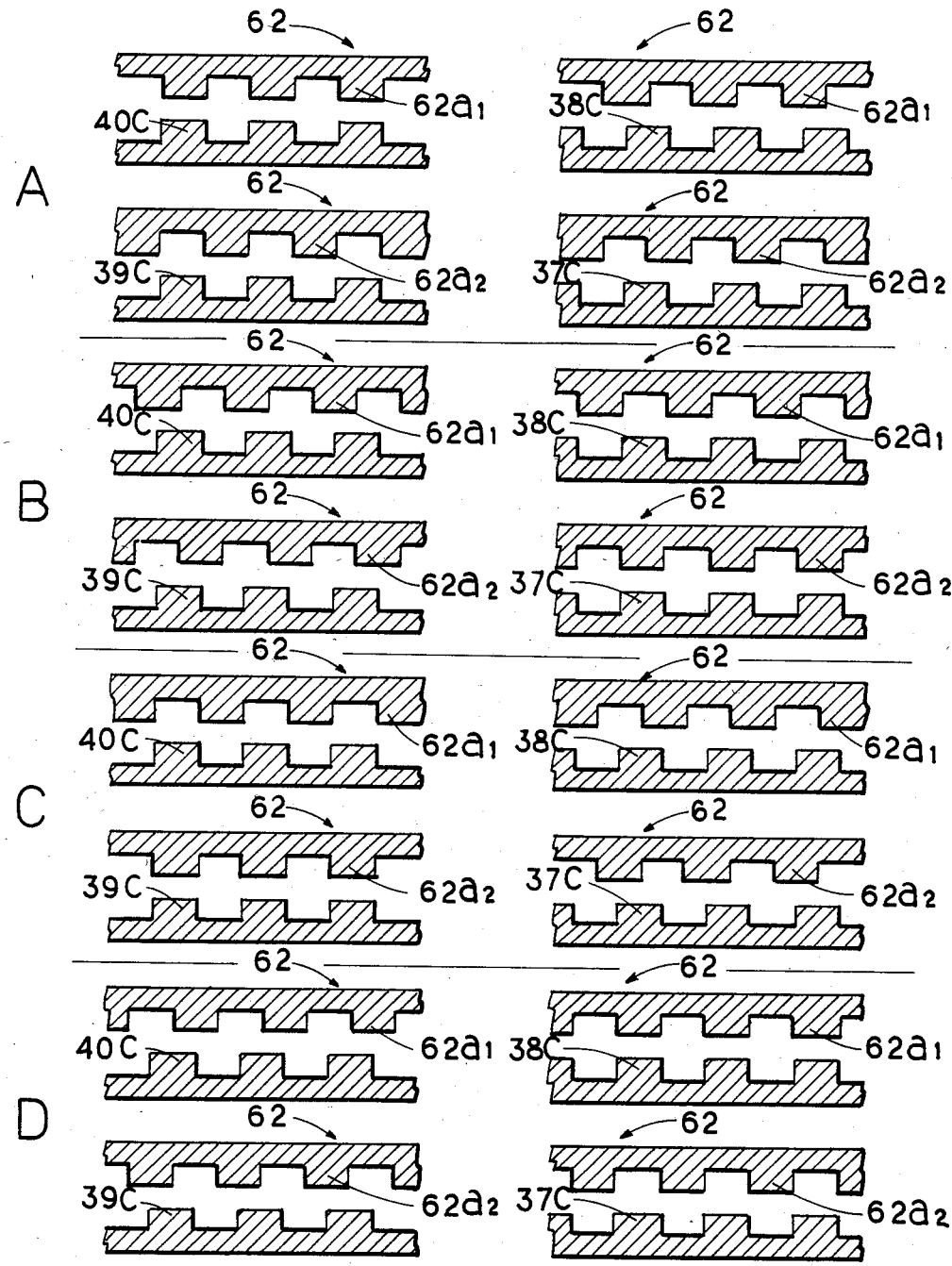
FIG. 7 is cross sectional views showing the relationships between the first teeth and the second and third teeth in the respective phases for explaining operation of the first embodiment.
Figure 8:
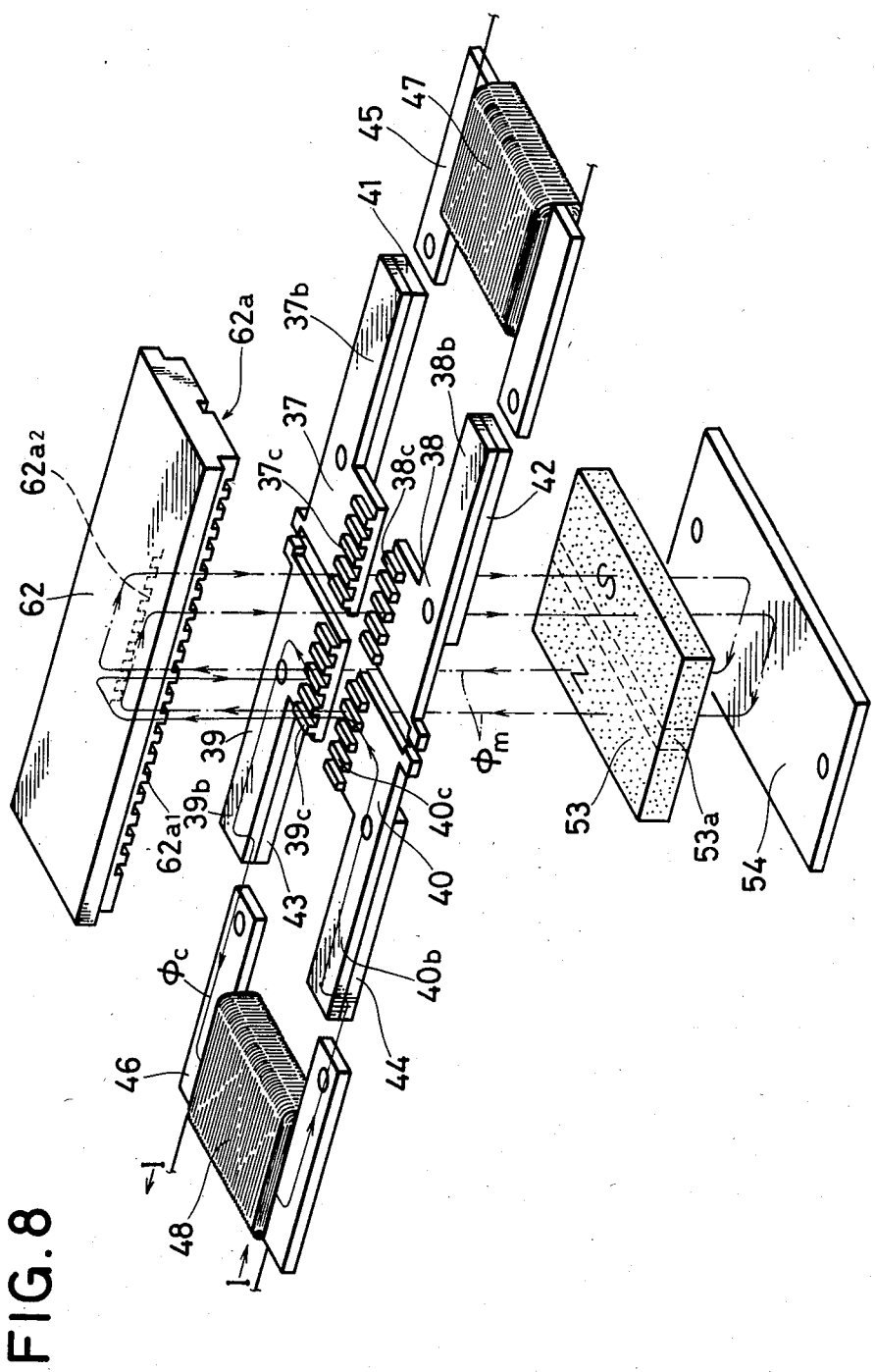
FIG. 8 is a perspective view of the linear pulse motor for explaining magnetic flux flow in which the primary body, secondary body and the coils are separated from one another and the other parts in FIG. 3 are omitted for clarification of magnetic flux flow.
Figure 9:
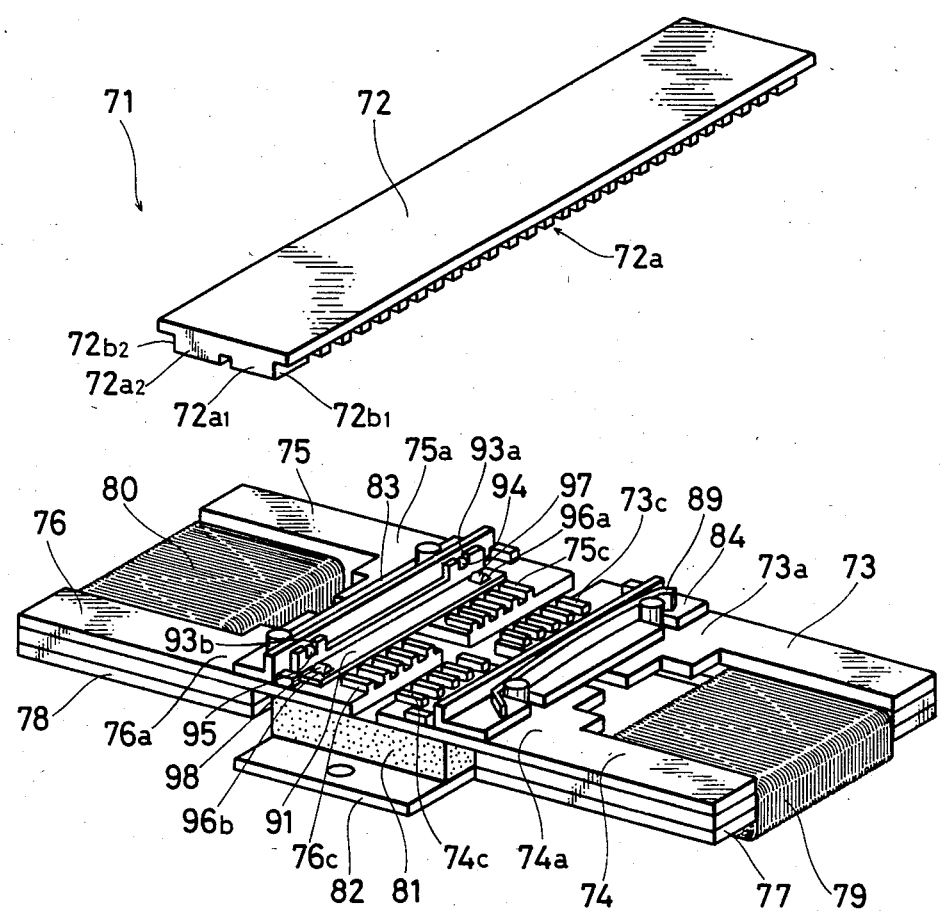
FIG. 9 is a perspective view of a linear pulse motor according to a second embodiment of this invention, in which a secondary body is separated away from a primary body.
Figure 10:
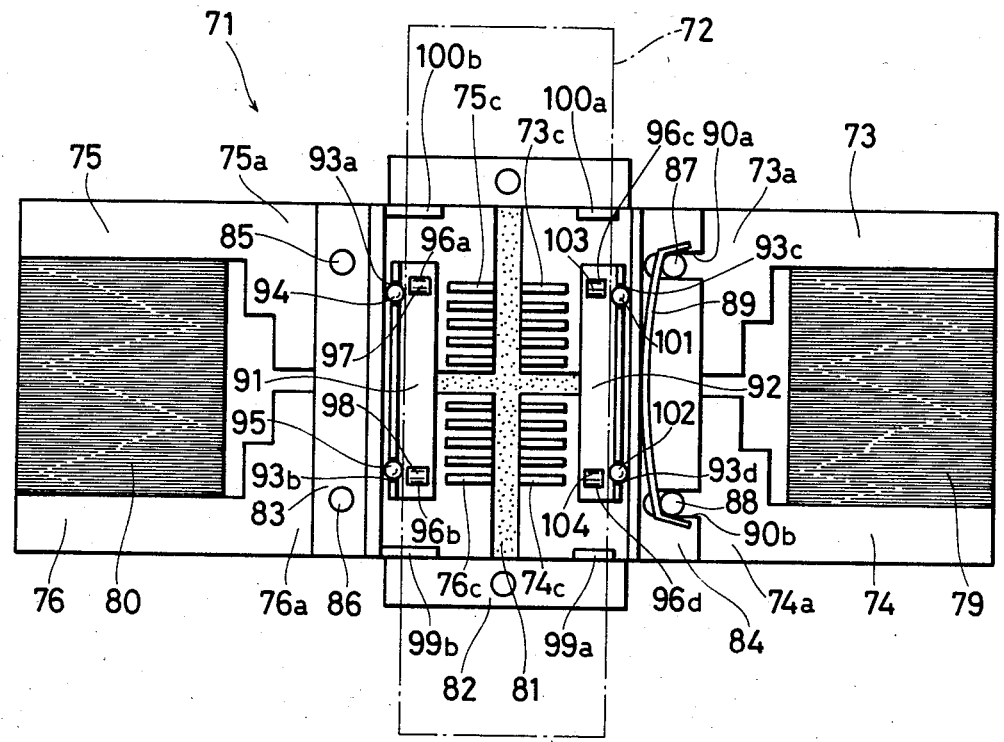
FIG. 10 is a plan view of the linear pulse motor of FIG. 9, in which the secondary body is shown by the phantom line.
Figure 11:
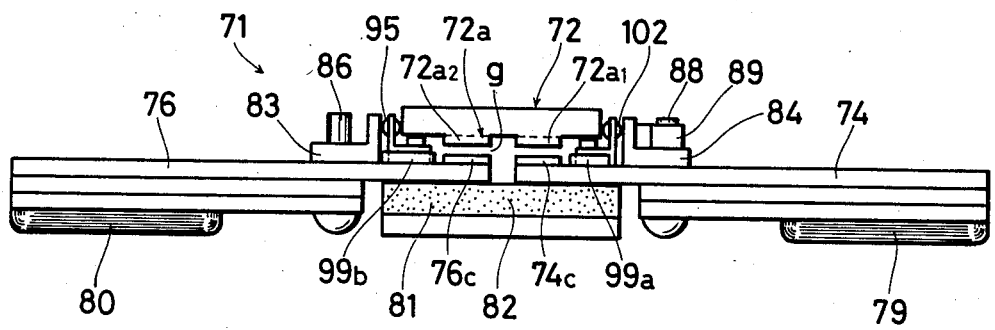
FIG. 11 is a front view of the linear pulse motor, in which the primary body and the secondary body are assembled with each other.

The secondary body 62 is plate-like. Teeth or ridges 62a are formed at the same pitch P as the first mentioned teeth 37c to 40c of the primary body 70 in the lower surface of the secondary body 62 as shown in FIG. 6. Further, cut-outs 62b1 and 62b2 having L-shaped cross-section are formed in both sides of the secondary body 62, and they contact with the balls 59 to 61. Thus, a predetermined air gap g is obtained between the teeth 62a of the secondary body 62 and the teeth 37c to 40c of the magnetic pole members 37 to 40. The balls 58 to 61 are softly pinched between the ball guide portions 35a1, 35a2, 36a1, 36a2 and the cutouts 42b1, 42b2 by spring action of the leaf spring 57. The balls 58 to 61 are rollable within the ranges of the ball guide portions 55a1, 55a2, 56a1 and 56a2 and guide the secondary body 62.

As clearly shown in FIG. 6, the teeth 62a of the seconday body 62 consist of second and third teeth 62a1 and 62a2 which are in parallel rows and shifted from each other by a half of the pitch ($\frac{1}{2}$P). The second teeth 62a1 confront one pair of the first teeth 38c and 40c of the primary body 70, while the third teeth 62a2 confront another pair of the first teeth 37c and 39c. The first teeth 39c and 40c, and 37c and 38c are aligned with each other, respectively. However, the groups of the first teeth 37c to 40c are shifted by a quarter of the pitch ($\frac{1}{4}$P) in phase from one another with respect to the confronted one of the second and third teeth, in the order of the teeth 40c, 37c, 39c and 38c.

Next, there will be described operations of the above-described linear pulse motor.

The head portions 39a and 40a of the magnetic pole members 39 and 40 are N-polarized by the permanent magnet 53, while the head portion 37a and 38a of the magnetic pole members 37 and 38 are S-polarized by the permanent magnet 53.

It is now assumed for facilitating the understanding that the teeth 38c of the head portion 38a is directly facing to the second teeth 62a1 of the secondary body 62 as shown in FIG. 7D. A positive DC current +I is supplied to the coil 48 for a predetermined time. Induced magnetic flux $\phi c$ by the coil and magnetic flux $\phi m$ from the permanent magnet 53 flow in the paths and directions shown in FIG. 8. The induced magnetic flux $\phi c$ flows through the one leg portion 40b→the one head portion 40a→the one group of the first teeth 40c→the air gap g→the second teeth 62a1 of the secondary body 62→the third teeth 62a2 thereof→the air gap g→the other group of the first teeth 39c→the other head portion 39a→the other leg portion 39b. The magnetic flux $\phi m$ from the permanent magnet 53 flows through the one pair of the first teeth 39c and 40c→the air gap g→the second and third teeth 62a1, 62a2 of the secondary body 62→the air gap g→the other pair of the first teeth 37c and 38c→the fixing plate 54. Thus, the induced magnetic flux $\phi c$ by the coil 48 and the magnetic flux $\phi m$ from the permanent magnet 53 are added to each other in the teeth 40c of the head portion 40a, and the air gap g between the second teeth 62a1 of the secondary body 62 and the first teeth 40c of the head portion 40a, while the induced magnetic flux is cancelled with the magnetic flux from the permanent magnet 53 in the teeth 39c of the head portion 39a, and the air gap g between the third teeth 62a2 of the secondary body 62 and the teeth 39c of the head portion 39a. Magnetic attraction occurs between the second teeth 62a1 of the secondary body 62 and the first teeth 40c of the head portion 40a. The secondary body 62 steps forwards by $\frac{1}{4}$ pitch so that the second teeth 62a1 of the secondary body 62 comes to face directly to the teeth 40c of the head portion 40a as shown in FIG. 7A.

At the same time when the coil 48 is deenergized, the coil 47 is energized. The positive DC current +I is supplied to the coil 47 for the predetermined time. Induced magnetic flux and magnetic flux from the permanent magnet 53 are added to each other in the teeth 37c of the head portion 37a, and the air gap g between the third teeth 62a2 of the secondary body 62 and the first teeth 37c of the head portion 37a, while the induced magnetic flux is cancelled with the magentic flux from the permanent magnet 53 in the teeth 38c of the head portion 38a, and the air gap g between the second teeth 62a2 of the secondary body 62 and the teeth 38c of the head portion 38a. Magnetic attraction occurs between the third teeth 62a2 of the secondary body 62 and the first teeth 37c of the head portion 37a. The secondary body 62 steps forwards by $\frac{1}{4}$ pitch so that the third teeth 62a2 of the secondary body 62 comes to face directly to the first teeth 37c of the head portion 37a, as shown in FIG. 7B.

At the same time when the coil 47 is deenergized, the coil 48 is energized. A negative DC current $-I$ is supplied to the coil 48 for the predetermined time. Induced magnetic flux and magnetic flux from the permanent magnet 53 are added to each other in the teeth 39c of the head portion 39a, and the air gap g between the third teeth 62a2 of the secondary body 62 and the teeth 39c of the head portion 39a, while the induced magnetic flux is cancelled with the magnetic flux from the permanent magnet 53 in the teeth 40c of the head portion 40a, and the air gap between the second teeth 62a1 of the secondary body 62 and the teeth 40c of the head portion 40a. Magnetic attraction occurs between the teeth third 62a2 of the secondary body 62 and the teeth 39c of the head portion 39a. The secondary body 62 steps forwards by $\frac{1}{4}$ pitch so that the third teeth 62a2 of the secondary body 62 comes to face directly to the teeth 39c of the head portion 39a, as shown in FIG. 7C.

At the same time when the coil 48 is deenergized, the coil 47 is energized. The negative DC current $-I$ is supplied to the coil 47 for the predetermined time. Induced magnetic flux and magnetic flux from the permanent magnet 53 are added to each other in the teeth 38c of the head portion 38a, and the air gap g between the second teeth 62a1 of the secondary body 62 and the teeth 38c of the head portion 38a, while the induced magnetic flux is cancelled with the magnetic flux from the permanent magnet 53 in the teeth 37c of the head portion 37a, and the air gap g between the third teeth 62a2 of the secondary body 62 and the teeth 37c of the head portion 37a. Magnetic attraction occurs between the second teeth 62a1 of the secondary body 62 and the teeth 38c of the head portion 38a. The secondary body 62 step forwards by $\frac{1}{4}$ pitch so that the second teeth 62a1 of the secondary body 62 comes to face directly to the teeth 38c of the head portion 38a, as shown in FIG. 7D.

Thus, the secondary body 62 is displaced by one pitch. After that time, the coils 46 and 47 are alternately energized in the above described manner. Although the secondary body 62 is moved step by step, it looks to move continuously. The permissible largest stroke of the secondary body 62 is determined by the permissible rolling range of the balls 58 to 61, and it is equal to the double of the length of the ball guide portions 55a1, 55a2, 56a1, 56a2. The secondary body 62 is moved backwards by reversing the above described energization order of the coils 47 and 48.

The linear pulse motor of the first embodiment can be small-sized in height, length and width in comparison with the prior art linear pulse motor.

Next, a linear pulse motor according to a second embodiment of this invention will be described with reference to FIG. 9 to FIG. 13.

In this embodiment, a plate-like secondary body 72 is moved in a direction perpendicular to the lengthwise direction of a primary body 71, in comparison with the linear pulse motor of the first embodiment.

Similarly to the secondary body 62 of the first embodiment, teeth or ridges 72a are formed at the constant pitch in the lower surface of the secondary body 72, and cutouts 72b1 and 72b2 having L-shaped cross-section are formed at both sides.

Four L-shaped magnetic pole members 73 to 76 are so arranged as to form generally a letter H. In the same manner as the first embodiment, head portions 73a to 76a of the magnetic pole members 73 to 76 are concentrated. However, upstanding teeth or ridges 73c to 76c formed in the end portions of the head portions 73a to 76a extend in the lengthwise direction of the magnetic pole members 73 to 76, in contrast to the teeth or ridges of the head portions 37a to 40a of the first embodiment. U-shaped magnetic core frames 77 and 78 are attached to the lower surfaces of the magnetic pole members 73 to 76. Coils 79 and 80 are fitted to the central portions of the magnetic core frames 77 and 78, respectively.

A permanent magnet 81 polarized in the same manner as the permanent magnet 53 of the first embodiment is attached to the lower surfaces of the head portions 73a to 76a. The head portions 75a and 76a of the magnetic pole members 75 and 76 are N-polarized by the permanent magnet 81, while the head portions 73a and 74a of the magnetic pole members 73 and 74 are S-polarized by the permanent magnet 81.

The pitches (P) of the teeth 73c to 76c are equal to one another, and equal to those of the teeth 72a of the secondary body 72.

Figure 12:
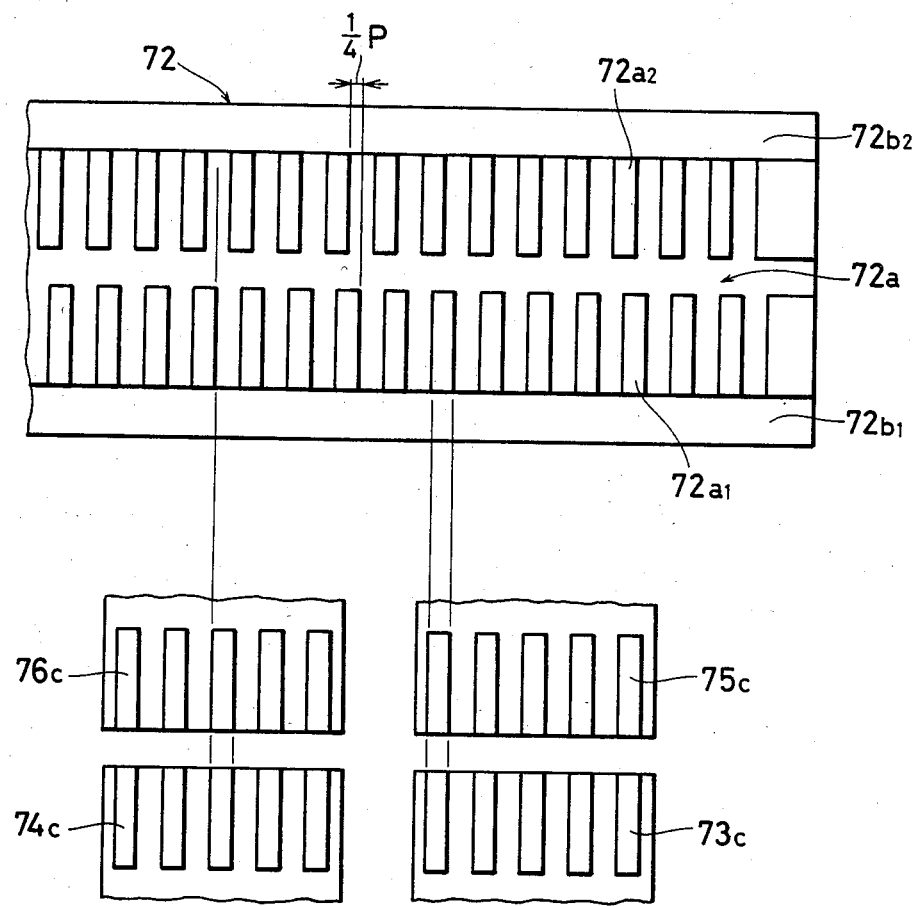
FIG. 12 is a view showing the relationship between first teeth formed in the primary body and second and third teeth formed in the secondary body in which the primary body is partially shown in plan view and the secondary body is partially shown in back view and FIG. 13 is cross sectional views showing the relationships between the first teeth and the second and third teeth in the respective phases for explaining operation of the second embodiment.
Figure 13:
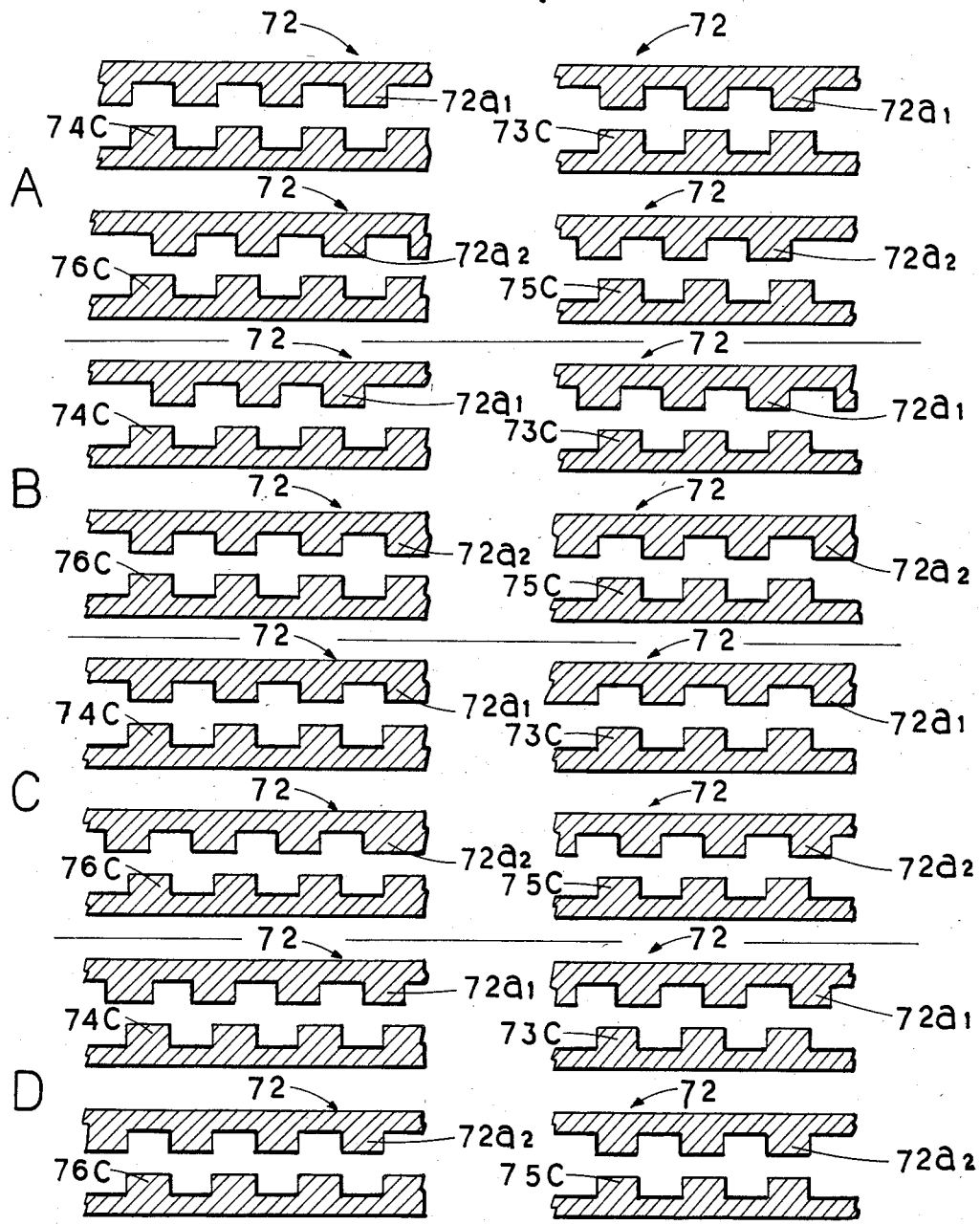

As clearly shown in FIG. 12, the teeth 72a of the secondary body 72 consist of second and third teeth 72a1, and 72a2 which are in parallel rows and shifted from each other by a quarter of the pitch ($\frac{1}{4}$P). The second teeth 72a1 confront the first teeth 73c and 74c of the magnetic pole members 73 and 74 of the primary body 71, while the third teeth 72a2 confront the first teeth 75c and 76c of the magnetic pole members 75 and 76. The first teeth 73c and 75c, and 74c and 76c are aligned with each other, respectively. However, the groups of the first teeth 73c to 76c are shifted by a quarter of the pitch ($\frac{1}{4}$P) in phase from one another with respect to the confronted one of the second and third teeth 72a1 and 72a2, in the order of the teeth 73c, 76c, 74c and 75c.

A fixing plate 82 of magnetic material is arranged under the permanent magnet 81. It constitutes a part of a magnetic circuit. A primary body 71 consisting of the magnetic pole members 73 to 76, the magnetic core frames 77 and 78, the permanent magnet 81, the coils 79 and 80, etc., is fixed through the fixed plate 82 to a not-shown stationary body.

Support members 83 and 84 having L-shaped cross-section, of non-magnetic material, are arranged at both sides of the teeth 73c to 76c. The one support member 83 is fixed to the head portions 75a and 76a by rivets 85 and 86. A pair of oblong cutouts 90a and 90b are formed in the other support member 84. Rivets 87 and 88 fixing the magnetic core frame 77 to the magnetic pole members 73 and 74 are freely engaged with the cutouts 90a and 90b. A leaf spring 89 is fitted at both ends to the rivets 87 and 88, and it urges the other support member 84 towards the one support member 83. A pair of guide members 91 and 92 having L-shaped cross-section, of non-magnetic material are arranged back to back with the support members 83 and 84. Pairs of cutouts 93a and 93b, 93c and 93d are formed in the vertical portions of the guide members 92 and 92, respectively. Balls 94 and 95 are rollably fitted into the cutouts 93a and 93b of the guide member 91. Similarly, balls 101 and 102 are rollably fitted into the cutouts 93c and 93d. Further pairs of cutouts 96a and 96b, 96c and 96d are formed in the horizontal portions of the guide members 91 and 92, respectively. Rollers 97 and 98, 103 and 104 are rollably fitted into the cutouts 96a and 96b, 96c and 96d, respectively.

Stoppers 99a, 99b, 100a and 100b are fixed on the outer ends of the head portions 73a to 76a between the support members 83 and 84. The movement of the guide members 91 and 92 is limitted by the stoppers 99a, 99b, 100a and 100b. The secondary body 72 is guided at both sides by the balls 94, 95, 101 and 102. The cutouts 72b1 and 72b2 of the secondary body 72 ride on the rolls 97, 98, 103 and 104. The air gap g between the teeth 72a of the secondary body 72 and the teeth 73c to 76c of the head portions 73a to 76a of the primary body 71 is obtained by the rolls 97, 98, 103 and 104. The range of the movement of the secondary body 72 is determined by the range of the movement of the guide members 91 and 92, and the former is equal to the double of the latter.

Next, there will be described operations of the above-described linear pulse motor.

The head portions 75a and 76a of the magnetic pole members 75 and 76 are N-polarized by the permanent magnet 81, while the head portion 73a and 74a of the magnetic pole members 73 and 74 are S-polarized by the permanent magnet 81.

It is now assumed for facilitating the understanding that the teeth 75c of the head portion 75a is directly facing to the third teeth 72a2 of the secondary body as shown in FIG. 13D. A positive DC current +I is supplied to the coil 72/79 for a predetermined time. Induced magnetic flux $\phi c$ by the coil and magnetic flux $\phi m$ from the permanent magnet 81 flow in the following manner. The induced magnetic flux flow through the one leg portion 74→the one head portion 74a→the one group of the first teeth 74c→the air gap g→the second teeth 72a1 of the secondary body 72→the other portions of the second teeth 72a1 thereof→the air gap g→the other group of the first teeth 73c→the other head portion 73a→the other leg portion 73. The magnetic flux from the permanent magnet 81 flows through the one pair of the first teeth 75c and 76c→the air gap g→the second and third teeth 72a1, 72a2 of the secondary body 72→the air gap g→the other pair of the first teeth 73c and 74c→the fixing plate 82. Thus, the induced magnetic flux by the coil 72 and the magnetic flux from the permanent magnet 81 are added to each other in the teeth 73c of the head portion 73a, and the air gap g between the second teeth 72a of the secondary body 72 and the first teeth 73c of the head portion 73a, while the induced magnetic flux is cancelled with the magnetic flux from the permanent magnet 81 in the teeth 74c of the head portion 74a, and the air gap g between the second teeth 72a1 of the secondary body 72 and the teeth 74c of the head portion 74a. Magnetic attraction occurs between the second teeth 72a1 of the secondary body 72 and the first teeth 73c of the head portion 73a. The secondary body 72 steps forwards by $\frac{1}{4}$ pitch so that the second teeth 72a1 of the secondary body 72 comes to face directly to the teeth 73c of the head portion 73a, as shown in FIG. 13A.

At the same time when the coil 79 is deenergized, the coil 80 is energized. The positive DC current +I is supplied to the coil 80 for the predetermined time. Induced magnetic flux and magnetic flux from the permanent magnet 81 are added to each other in the teeth 76c of the head portion 76a, and the air gap g between the third teeth 72a2 of the secondary body 72 and the first teeth 76c of the head portion 76a, while the induced magnetic flux is cancelled with the magnetic flux from the permanent magnet 81 in the teeth 75c of the head portion 75a, and the air gap g between the third teeth 72a2 of the secondary body 72 and the teeth 75c of the head portion 75a. Magnetic attraction occurs between the third teeth 72a2 of the secondary body 72 and first teeth 76c of the head portion 76a. The secondary body 72 steps forwards by ¼ pitch so that the third teeth 72a2 of the secondary body 72 comes to face directly to the first teeth 76c of the head portion 76a, as shown in FIG. 13B.

At the same time when the coil 80 is deenergized, the coil 79 is energized. A negative DC current −I is supplied to the coil 79 for the predetermined time. Induced magnetic flux and magnetic flux from the permanent magnet 81 are added to each other in the teeth 74c of the head portion 74a, and the air gap g between the second teeth 72a1 of the secondary body 72 and the teeth 74c of the head portion 74a, while the induced magnetic flux is cancelled with the magnetic flux from the permanent magnet 81 in the teeth 73c of the head portion 73a, and the air gap between the second teeth 72a1 of the secondary body 72 and the teeth 73c of the head portion 73a. Magnetic attraction occurs between the second teeth 72a1 of the secondary body 72 and the teeth 74c of the head portion 74a. The secondary body 72 steps forwards by ¼ pitch so that the second teeth 72a1 of the secondary body 72 comes to face directly to the teeth 74c of the head portion 74a, as shown in FIG. 13C.

At the same time when the coil 79 is deenergized, the coil 80 is energized. The negative DC current −I is supplied to the coil 80 for the predetermined time. Induced magnetic flux and magnetic flux from the permanent magnet 81 are added to each other in the teeth 75c of the head portion 75a, and the air gap g between the third teeth 72a2 of the secondary body 72 and the teeth 75c of the head portion 75a, while the induced magnetic flux is cancelled with the magnetic flux from the permanent magnet 81 in the teeth 76c of the head portion 76a, and the air gap g between the third teeth 72a2 of the secondary body 72 and the teeth 76c of the head portion 76a. Magnetic attraction occurs between the third teeth 72a2 of the secondary body 72 and the teeth 75c of the head portion 75a. The secondary body 72 steps forwards by ¼ pitch so that the third 72a2 of the secondary body 72 comes to face directly to the teeth 75c of the head portion 75a, as shown in FIG. 13D.

Thus, the coils 79 and 80 are alternately energized in the above described manner. Magnetic attraction occurs between the teeth 73c to 76c of the primary body 71 and the teeth 72a1 or 72a2 of the secondary body 72 in the order of the teeth 73c, 76c, 74c and 75c. The secondary body 72 is moved forwards step by step guided by the balls 94, 95, 101, 102 of the guide members 91 and 92 in the direction perpendicular to the leg portions of the magnetic pole members 73 to 76.

In the above described embodiments of FIG. 3 to FIG. 13, the primary body is fixed to the nog-shown stationary body, and the secondary body is movable. However, when the secondary body is fixed to a not-shown stationary body, the primary body is movable. For example, a head in a printer or an optical reading apparatus is fixed to the secondary body, and it is accurately positioned by controlling the energizations of the coils.

The above embodiments have further the following advantages:

(1) The magnetic pole surfaces are concentrated to one another in contrast to the prior art linear pulse motor. Accordingly, magnetic path length can be shorter, and magnetic flux efficiency can be improved.

(2) On the ground of the above paragraph (1), the secondary body can be small-sized. When the secondary body is movable, the ratio of the propelling force to the weight of the movable body can be increased. Accordingly, the response can be improved.

(3) Magnetic path lengths of magnetic fluxes from permanent magnet can be uniform. Accordingly, propelling forces can be substantially uniform, and the positioning accuracy can be improved.

(4) The whole of the linear pulse motor can be flat or thin. Accordingly, its application fields can be widened.

While the preferred embodiments have been described, variations thereto will occur to those skilled in the art within the scope of the present inventive concepts which are delineated by the following claims.

In the above embodiments, the teeth of the primary body are formed as ridges in the head portions of the magnetic pole members. However, they may be formed as slits in the head portions of the magentic pole members. In that case, the pair of the magnetic members may be combined as one body. Although leakage of magnetic flux is increased, and efficiency is lowered, the mechanical strength is increased.

Further in the above embodiments, the two coils are alternately energized one by one (one phase excitation method). However, they may be energized at the same time (two phase excitation method). Further, the support members 83, 84 and guide members 91 and 92 in the second embodiment may be used in the first embodiment, instead of the guide members 55 and 56. Or the guide members 55 and 56 in the first embodiment may be used in the second embodiment, instead of the support members 83 and 84 and guide members 91 and 92.

Further, in the above embodiments, the primary body 70 or 71 includes the pair of the first magnetic circuit forming means, each of which includes two head portions and two leg portions. The two leg portions may be united with each other. For example, in the first embodiment, the leg portions 39b and 40b, and 37b and 38b may be combined as one body with each other by a yoke member, respectively. In such a case, the coil may be fitted to the yoke member.

Further, in the above embodiments, the permanent magnet is contacted with the back surfaces of the head portions. However, it may be interposed between the side surfaces of the head portions.

Further, in the above embodiments, the second and third teeth are shifted in phase from each other by a half or pitch (½P) or a quarter of pitch (¼P). The paired first teeth 37c and 38c, 39c and 40c, 73c and 75c, and 74c and 76c are aligned with each other in the direction perpendicular to the moving direction of the secondary body. Such a fact is convenient for manufacturing. However, the second and third teeth may be shifted in phase from each other by a predetermined length other than ½P and ¼P.

Further, in the second embodiment, the rollers 97, 98, 103 and 104 are used for maintaining the air gap. Instead of the rollers, balls may be used. However, the balls contact in point with the secondary body, and the rollers contact in line with the secondary body. Accordingly, when the load is equal, the rollers can have longer life and can maintain the constant air gap for a longer time.

In the above-mentioned two-phase excitation method, the two coils are energized in the following manner: In the first mode (phase 0°–90°), both of the coils in positive polarity; in the second mode (phase 90–180*), one of the coils in negative polarity, while the other of the coils in positive polarity; in the third mode (phase 180°–270°), both of the coils in negative polarity, and in the fourth mode (phase 270°–360°), the one of the coils in positive polarity, while the other of the coils in negative polarity.

Other known excitation methods may be applied to the linear pulse motor of this invention.

What is claimed is:

1. A linear pulse motor comprising:
(A) a flat primary body including a pair of first magnetic circuit forming means provided with coil means;
(B) a flat secondary body including second magnetic circuit forming means;
(C) said flat primary body and said flat secondary body being in parallel planes to each other and the one being movable relative to the other in one axis of direction;
(D) said first magnetic circuit forming means each having two head portions and two leg portions being substantially parallel to each other;
(E) first plural teeth being formed at constant pitch (P) in said head portions respectively;
(F) said pair of first magnetic circuit forming means being so arranged that said head portions are concentrated to one another;
(G) second and third plural teeth being formed at the same constant pitch (P) as said first plural teeth and in parallel rows, in said second magnetic circuit forming means, said second and third plural teeth being shifted from each other by a predetermined length;
(H) the groups of said first plural teeth being shifted from one another in a predetermined order by a quarter of the constant pitch (¼P) with respect to said second and third plural teeth;
(I) a permanent magnet being so contacted with said head portions of the pair of first magnetic circuit forming means that the two head portions of one of the first magnetic circuit forming means are N-polarized and those of the other of the first magnetic circuit forming means are S-polarized;
(J) guide means for guiding said one of the primary body and the secondary body movably in said one axis of direction, arranged between said primary body and said secondary body for maintaining the constant air gap between said first plural teeth, and said second and third plural teeth; and
(K) the axes of said coil means around which said coil means are wound being substantially perpendicular to said constant air gap.

2. A linear pulse motor according to claim 1, in which said first plural teeth are substantially perpendicular to said leg portions, the two of the groups of said first plural teeth aligned in said one axis of direction confront the one of said second and third plural teeth and the other two of the groups of said first plural teeth aligned in said one axis of direction confront the other of said second and third plural teeth.

3. A linear pulse motor according to claim 2, in which said predetermined length is equal to a half of the pitch (½P).

4. A linear pulse motor according to claim 2, in which said coil means are energized in such a manner that one of said coil means is energized in positive polarity for a predetermined time, at the same time as the deenergization of said one coil means, the other of said coil means is energaized in positive polarity for the predetermined time, at the same time as the deenergization of said other coil means, said one coil means is energized in negative polarity for the predetermined time, and at the same time as the deenergization of said one coil means, said other coil means is energized in negative polarity for the predetermined time.

5. A linear pulse motor according to claim 2, in which the groups of said first plural teeth of the head portions of the paired first magnetic circuit forming means are shifted from one another by a quarter of the pitch with respect to said second and third plural teeth in the following order of: one of the head portions of the one first magnetic circuit forming means, confronting the second plural teeth; one of the head portions of the other first magnetic circuit forming means, confronting the third plural teeth; the other of the head portions of the one first magnetic circuit forming means, confronting the third plural teeth; and the other of the head portions of the other first magnetic circuit forming means, confronting the second plural teeth.

6. A linear pulse motor according to claim 2, in which said guide means includes a pair of guide members arranged on the outer side end portions of said head portions along said leg portions and balls arranged in guide portions of said guide members, one of said guide members is fixed to said primary body, while the other of said guide members is so supported on said primary body as to be movable towards said one of the guide members, and is urged towards said one of the guide members by a spring, and cutout portions formed along the lengthwise sides of said secondary body ride on said balls, said balls being softly pinched between said cutout portions of the secondary body and said guide portions of the guide members.

7. A linear pulse motor according to claim 6, in which the rolling range of said balls are limited to a certain extent in the moving direction of said one of the primary body and the secondary body.

8. A linear pulse motor according to claim 1, in which said first plural teeth are substantially parallel to said leg portions, the two of the groups of said first plural teeth aligned in said one axis of direction confront the one of said second and third plural teeth and the other two of the groups of said first plural teeth aligned in said one axis of direction confront the other of said second and third plural teeth.

9. A linear pulse motor according to claim 8, in which said predetermined length is equal to a quarter of the pitch (¼P).

10. A linear pulse motor according to claim 8, in which said coil means are energized in such a manner that one of said coil means is energized in positive polarity for a predetermined time, at the same time as the deenergization of said one coil means, the other of said coil means is energized in positive polarity for the predetermined time, at the same time as the deenergization of said other coil means, said one coil means is energized in negative polarity for the predetermined time, and at the same time as the deenergization of said one coil means, said other coil means is energized in negative polarity for the predetermined time.

11. A linear pulse motor according to claim 8, in which the groups of said first plural teeth of the head portions of the paired first magnetic circuit forming means are shifted from one another with respect to said second and third plural teeth by a quarter of the pitch in the following order of: one of the head portions of the one first magnetic circuit forming means, confronting the second plural teeth; one of the head portions of the other first magnetic circuit forming means, confronting the third plural teeth; the other of the head portions of the one first magnetic circuit forming means, confronting the second plural teeth; and the other of the head portions of the other first magnetic circuit forming means, confronting the third plural teeth.

12. A linear pulse motor according to claim 8, in which said guide means includes a pair of guide members arranged at both sides of the groups of said head portions in a substantially perpendicular direction to said leg portions and balls arranged in guide portions of said guide members, one of said guide members is fixed to said primary body, while the other of said guide members is so supported on said primary body as to be movable towards said one of the guide members, and is urged towards said one of the guide members by a spring, and cutout portions formed along the lengthwise sides of said secondary body ride on said balls, said balls being softly pinched between said cutout portions of the secondary body and said guide portions of the guide members.

13. A linear pulse motor according to claim 12 in which the rolling range of said balls are limited to a certain extent in the moving direction of said one of the primary body and the secondary body.

14. A linear pulse motor according to claim 2, in which said guide means includes a pair of support members arranged on the outer side end portions, of said head portions along said leg portions a pair of guide members having generally L-shaped cross-section, arranged slidably along said support members, balls received by a pair of cutouts formed in a vertical portion of each of said guide members, and rollers received by a pair of cutouts formed in a horizontal protion of each of said guide members, one of said support members is fixed to said primary body, while the other of said support members is so supported on said primary body as to be movable towards said one of the support members, and is urged towards said one of the support members by a spring, cutout portions formed along the lengthwise sides of said secondary body ride on said rollers, said balls are softly pinched between the lengthwise sides of said secondary body and said support members for guiding the movement of said one of the primary body and secondary body, and said air gap is maintained by said rollers.

15. A linear pulse motor according to claim 14, in which stoppers are fixed to said primary body at such positions that the slide movements of said guide members along said support members are limited to a predetermined length thereby.

16. A linear pulse motor according to claim 8, in which said guide means includes a pair of support members arranged at both sides of the groups of said head portions in a substantially perpendicular direction to said leg portions, a pair of guide members having generally L-shaped cross-section, arranged slidably along said support members, balls received by a pair of cutouts formed in a vertical portion of each of said guide members, and rollers received by a pair of cutouts formed in a horizontal portion of each of said guide members, one of said support members is fixed to said primary body, while the other of said support members is so supported on said primary body as to be movable towards said one of the support members, and is urged towards said one of the support members by a spring, cutout portions formed along the lengthwise sides of said secondary body ride on said rollers, said balls are softly pinched between the lengthwise sides of said secondary body and said support members for guiding the movement of said one of the primary body and secondary body, and said air gap is maintained by said rollers.

17. A linear pulse motor according to claim 16, in which stoppers are fixed to said primary body at such positions that the slide movements of said guide members along said support members are limited to a predetermined length thereby.

* * * * *